United States Patent
Xie et al.

(10) Patent No.: US 7,107,612 B1
(45) Date of Patent: Sep. 12, 2006

(54) METHOD, APPARATUS AND COMPUTER PROGRAM PRODUCT FOR A NETWORK FIREWALL

(75) Inventors: Ken Xie, Atherton, CA (US); Yan Ke, San Jose, CA (US); Yuming Mao, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 14 days.

(21) Appl. No.: 10/893,283

(22) Filed: Jul. 19, 2004

Related U.S. Application Data

(63) Continuation of application No. 09/525,369, filed on Mar. 15, 2000, now Pat. No. 6,772,347, which is a continuation-in-part of application No. 09/283,730, filed on Apr. 1, 1999, now Pat. No. 6,701,432.

(51) Int. Cl.
*G06F 7/04* (2006.01)
*G06F 9/00* (2006.01)

(52) U.S. Cl. .............................. 726/13; 726/14; 726/6; 726/7

(58) Field of Classification Search ................ 726/14, 726/13, 12, 11, 7, 21, 26, 2–6
See application file for complete search history.

(56) References Cited

U.S. PATENT DOCUMENTS

| | | | |
|---|---|---|---|
| 5,606,668 A | 2/1997 | Shwed | 395/200.11 |
| 5,835,726 A | 11/1998 | Shwed et al. | 395/200.59 |
| 5,951,651 A | 9/1999 | Lakshman et al. | 709/239 |
| 5,983,270 A * | 11/1999 | Abraham et al. | 709/224 |
| 6,009,475 A | 12/1999 | Shrader | 709/249 |
| 6,016,310 A | 1/2000 | Muller et al. | 370/255 |
| 6,400,707 B1 | 6/2002 | Baum et al. | 370/352 |
| 6,701,432 B1 | 3/2004 | Deng et al. | 713/153 |
| 6,757,680 B1 * | 6/2004 | Choy | 707/9 |
| 6,772,347 B1 * | 8/2004 | Xie et al. | 726/11 |
| 6,845,452 B1 * | 1/2005 | Roddy et al. | 726/11 |
| 7,013,482 B1 * | 3/2006 | Krumel | 726/13 |
| 2002/0027907 A1 * | 3/2002 | Tateoka | 370/389 |
| 2002/0188720 A1 | 12/2002 | Terrell et al. | 709/225 |

FOREIGN PATENT DOCUMENTS

| | | |
|---|---|---|
| EP | 0 658 837 A1 | 6/1995 |
| EP | 0 893 921 A1 | 1/1999 |

OTHER PUBLICATIONS

Internet Security Systmes, http://www.iss.net/security_center/advice/intrusions/2001323, pp. 1-2.*
Tsuchiya, Paul F., "Extending the IP Internet through address reuse," Jan. 1993, ACM Sigcomm, vol. 23, Issue No. 1., pp. 16-33.*
Lodin, Steven et al., "Firewalls fend off invasion from the net," IEEE Spectrum Feb. 1998, pp. 26-34.*
"Network Address Translation Technical Discussion," 1996, htp://www.safety.net/nattech.html, pp. 1-4.*

* cited by examiner

*Primary Examiner*—Norman M. Wright
(74) *Attorney, Agent, or Firm*—Harrity Snyder, LLP

(57) ABSTRACT

An improved firewall for providing network security is described. The improved firewall provides for dynamic rule generation, as well using conventional fixed rules. This improvement is provided without significant increase in the processing time required for most packets. Additionally, the improved firewall provides for translation of IP addresses between the firewall and the internal network.

28 Claims, 6 Drawing Sheets

METHOD, APPARATUS AND COMPUTER PROGRAM PRODUCT FOR A NETWORK FIREWALL

RELATED APPLICATIONS

This application is a continuation of U.S. patent application Ser. No. 09/525,369 filed Mar. 15, 2000, which is now U.S. Pat. No. 6,772,347 continuation-in-part of co-pending application Ser. No. 09/283,730, filed on Apr. 1, 1999, now U.S. Pat. No. 6,701,432 B1, issued on Mar. 2, 2004, the disclosures of which are incorporated herein by reference.

FIELD OF THE INVENTION

The present invention relates to the field of computer networks. In particular, the present invention relates to a method, apparatus and computer program product for providing network security.

BACKGROUND OF THE INVENTION

A packet switch communication system includes a network of one or more routers connecting a plurality of users. A packet is the fundamental unit of transfer in the packet switch communication system. A user can be an individual user terminal or another network. A router is a switching device that receives packets containing data or control information on one port and, based on destination information contained within the packets, routes the packets out another port to their final destination, or to some intermediary destination(s). Conventional routers perform this switching function by evaluating header information contained within the packet in order to determine the proper output port for a particular packet.

As known, a communications network can be a public network, such as the Internet, in which data packets are passed between users over untrusted, i.e., non-secure communication links. Alternatively, various organizations, typically corporations, use what is known as an intranet communications network, accessible only by the organization's members, employees, or others having access authorization. Intranets typically connect one or more private servers, such as a local area network (LAN). The network configuration in a preferred embodiment of this invention can include a combination of public and private networks. For example, two or more LANs can be coupled together with individual terminals using a public network, such as the Internet. A network point that acts as an entrance to another network is known in the art as a gateway.

Conventional packet switched communication systems that include links between public and private networks typically include means to safeguard the private networks against intrusions through the gateway provided at the interface of the private and public networks. The means designed to prevent unauthorized access to or from a private are commonly known as firewalls, which can be implemented in both hardware and software, or a combination of both. Thus, a firewall is a device that can be coupled in-line between a public network and a private network for screening packets received from the public network.

Referring to FIG. 1, a conventional packet switch communication system 100 can include two (or more) private networks 102a and 102b coupled by a public network 104 for facilitating the communication between a plurality of user terminals 106. Each private network 102 can include one or more servers and a plurality of individual terminals. Each private network 102 can be an intranet, such as a LAN. Public network 104 can be the Internet, or other public network having untrusted links for linking packets between private networks 102a and 102b. In a preferred embodiment, at each gateway between a private network 102 and public network 104 there is a firewall 110.

The architecture of an illustrative prior art firewall is shown in FIG. 2a. The firewall 110 generally includes one or more public network links 120, one or more private network links 122, and memory controller 124 coupled to the network links by a PCI bus 125. Memory controller 124 is also coupled by a memory bus 129 to a memory (RAM) 126 and a firewall engine, implemented in a preferred embodiment as an ASIC 128. The firewall engine ASIC 128 performs packet screening prior to routing packets through to private network 102. The firewall engine ASIC 128 processes the packets to enforce an access control policy, screening the packets in accordance with one or more sets of rules. The rules are described in more detail below. A central processor (CPU) 134 is coupled to memory controller 124 by a CPU bus 132. CPU 134 oversees the memory transfer operations on all buses shown. Memory controller 124 is a bridge connecting CPU bus 132, memory bus 129, and PCI bus 125.

In operation, packets are received at public network link 120. Each packet is transferred on bus 125 to, and routed through, memory controller 124 and on to RAM 126 via memory bus 129. When firewall engine 128 is available, packets are fetched using memory bus 129 and processed by the firewall engine 128. After processing, the packet is returned to RAM 126 using memory bus 129. Finally the packet is retrieved by the memory controller 124 using memory bus 129, and routed to private network link 122. The screening rules implemented by the firewall engine 128 are typically searched in linear order, beginning with the internal rule memory. Certain aspects of the rule structure are described below.

As known in the art, a rule is a control policy for filtering incoming and outgoing packets. Rules specify actions to be applied as against certain packets. When a packet is received for processing through a rule search, the packet's IP header, TCP header, or UDP header may require inspecting. A rule will generally include, at a minimum, source/destination IP addresses, UDP/TCP source/destination ports and transport layer protocol. Additional criteria may be used by the rules as well.

Generally, the address information is used as matching criterion—in other words to match a rule, a packet must have come from a defined source IP address and its destination must be the defined destination IP address. The UDP/TCP source/destination port specifies what client or server process the packet originates from on the source machine. The firewall engine can be configured to permit or deny a packet based upon these port numbers. The rule may include a range of values or a specific value for a TCP/UDP port. The transport layer protocol specifies which protocol above the IP layer, such as TCP or UDP, the policy rule is to be enforced against.

The firewall engine described above essentially screens packets using an access control list (ACL), and may be referred to as an ACL engine. That is, it performs a simple comparison of various matching criteria of an incoming IP packet—typically source, destination, port and protocol—to each rule in a rule set in sequence. Based upon this comparison, an incoming IP packet is either allowed or denied. A data-flow chart for this firewall engine is shown in FIG. 5.

It will be appreciated that using a fixed set of rules can be restrictive in many practical applications. Therefore, it is desirable to provide a system and method capable of adding rules to the rule set of the firewall engine dynamically—that is, to extract from a sequence of packets information, such as the port number and IP address, and generate new rules using this information. However, generating these new rules dynamically would increase the complexity of the comparison and decrease the speed of the firewall engine. There is therefore a need in the art for a firewall engine which can generate rules dynamically, based upon information extracted from incoming packets, with a limited impact on the speed of the firewall engine.

SUMMARY OF THE INVENTION

In accordance with a preferred embodiment, an apparatus, method and computer program product for providing network security is described. The apparatus includes an engine for sorting incoming IP packets into initially allowed and initially denied packets using a fixed set of rules. The packets are then sorted by a second engine. In one embodiment, the engine further sorts the initially denied packets into allowed packets and denied packets, using dynamically-generated rules. The denied packets are dropped and the allowed packets are permitted to enter the network.

Likewise, the method includes the step of sorting incoming IP packets into initially allowed and initially denied packets using a fixed set of rules. The packets are then further sorted. In one embodiment, additional steps include sorting the initially denied packets into allowed packets and denied packets, using dynamically generated rules. The denied packets are dropped and the allowed packets are permitted to enter the network.

Finally, the computer program product sorts incoming IP packets into initially allowed packets and initially denied packets. In one embodiment, the computer program product further sorts the initially denied packets into allowed packets and denied packets, using dynamically generated rules. The denied packets are dropped and the allowed packets are permitted to enter the network.

DETAILED DESCRIPTION OF THE INVENTION

Figure 1:
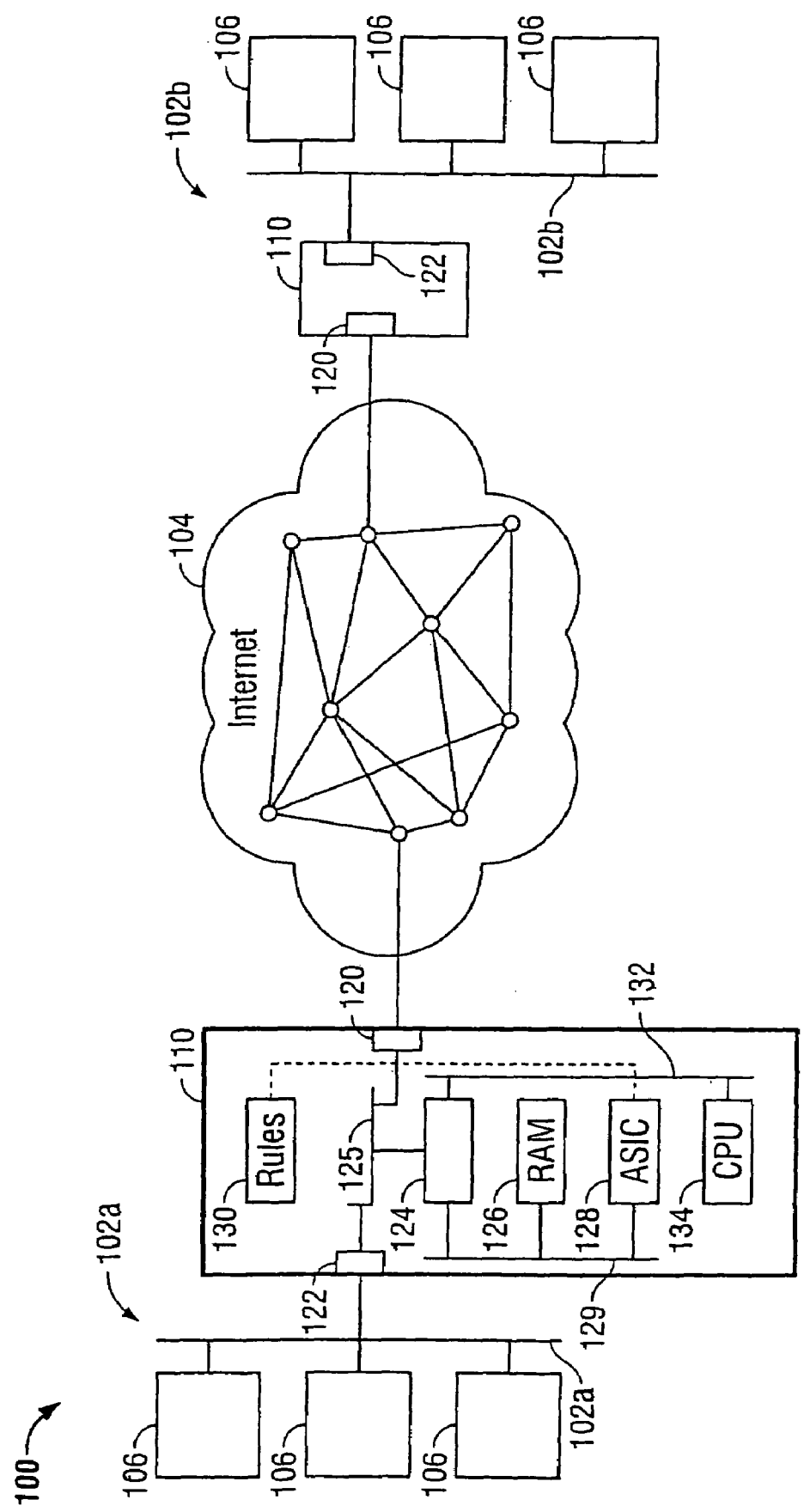
FIG. 1 illustrates an exemplary packet switch communications system.
Figure 2A:
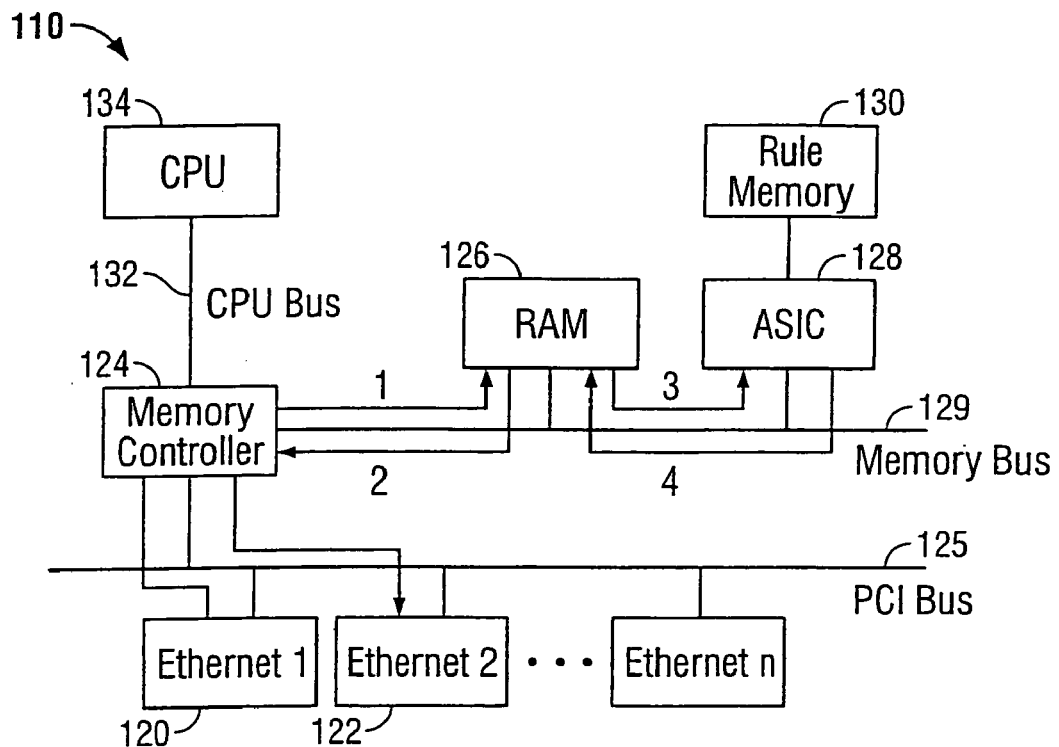
FIG. 2*a* illustrates a firewall with an application-specific integrated circuit (ASIC).
Figure 2B:
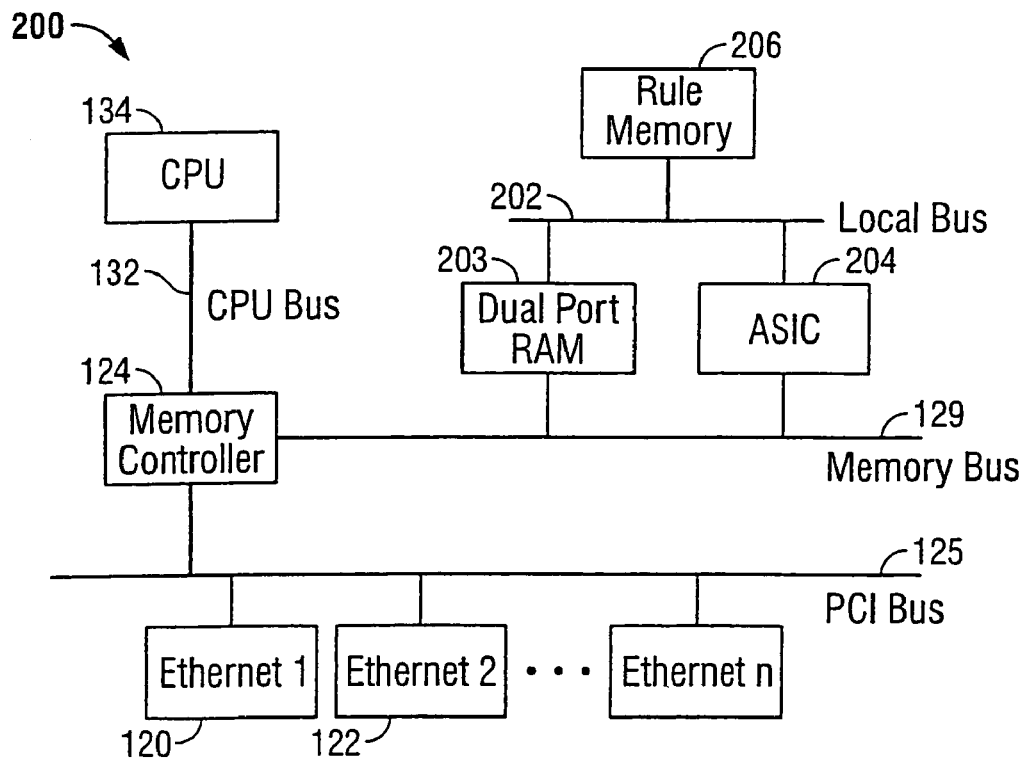
FIG. 2*b* illustrates a firewall with a local bus and an application-specific integrated circuit (ASIC).

A conventional firewall may be implemented in software, or in hardware as shown in FIG. 2*a*. Alternatively, a hybrid of software and hardware may also be used to implement a firewall. The firewall of FIG. 2*a* uses a memory bus 129 to communicate between the ASIC 128, the RAM 126, and the memory 130, which stores the rules used by the firewall. FIG. 2*b* shows a high-speed firewall that employs a local bus 202 for improved processing speed. A high-speed firewall is described in pending parent application Ser. No. 09/283,730, the contents of which is hereby incorporated by reference. Exemplary high-speed firewalls include NetScreen Technology, Inc.'s integrated firewall products, described at www.netscreen.com and related web pages. Selected web pages describing NetScreen's high-speed firewalls are provided as Appendix A to this application.

As shown in FIG. 2*b*, the high-speed firewall includes a hardware ASIC 204 to implement the firewall engine. The firewall engine retrieves packets stored in memory and processes each packet to enforce an access control policy. The processing by the firewall engine includes retrieving rules from a rule set, and screening the packets in accordance with the retrieved rules. In a specific embodiment, the rules may be stored in an internal memory in the ASIC 204, or may be retrieved from a separate rule memory 206 via the local bus 202. In a preferred embodiment, frequently accessed rule sets may be stored in the internal memory, with less-frequently accessed rule sets being stored in the separate rule memory 206.

Figure 3:
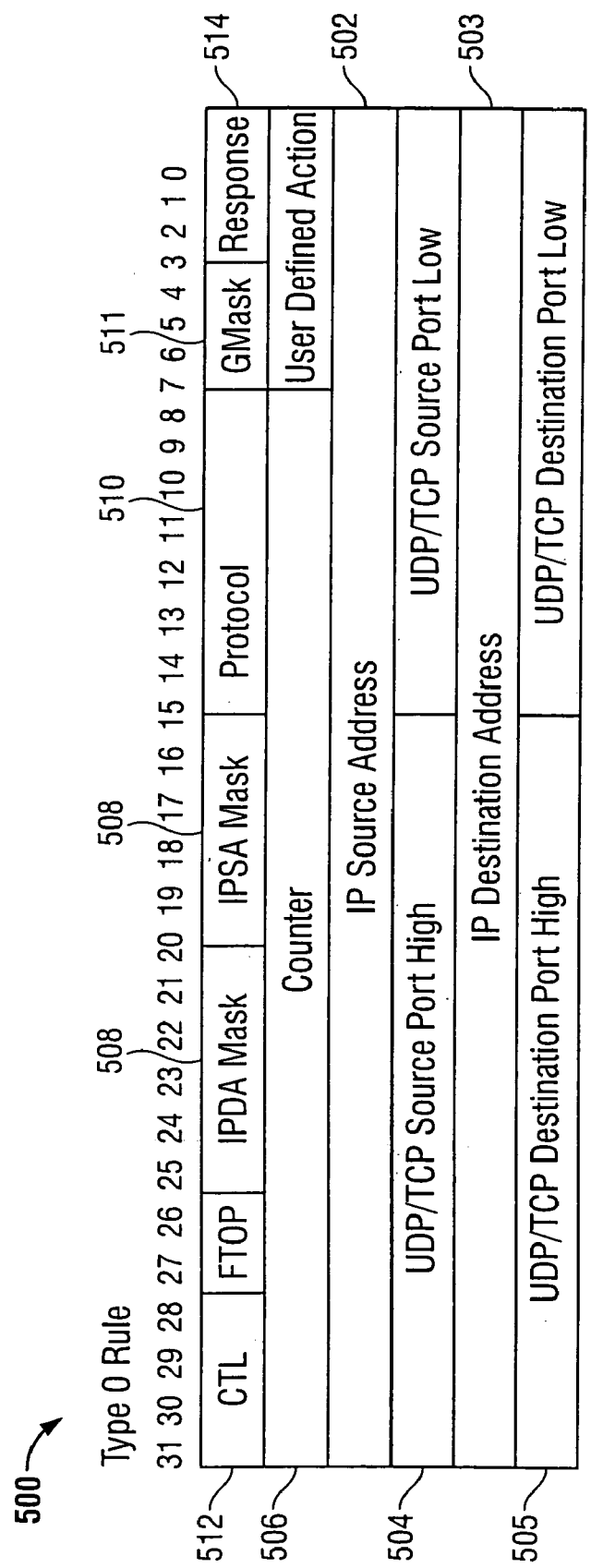
FIG. 3 illustrates an exemplary rule structure for use by a firewall.

The structure 500 of a rule used by a firewall engine in accordance with one embodiment of the present invention is shown in FIG. 3. A rule will generally include, at a minimum, source/destination IP addresses 502 503, UDP/TCP source/destination ports 504 505 and transport layer protocol 510. Additional information used by the rules may include: a range of values for the UDP/TCP source/destination port 504 505; a counter 506 to keep track of the number of times the rule has been matched; a general mask (GMASK) 511 to indicate whether to ignore or check certain information in the packet header; source/destination IP address mask 508 to indicate whether to ignore part of an IP address, typically a specified number of the least significant bits; a searching control field 512 to tell the firewall engine to search in the separate rule memory 206 and to give a starting address; and a response action field 514 to specify the action to be taken if the rule is matched.

The address information is used as matching criterion—to match a rule, a packet must have come from the defined source IP address 502 and its destination must be the defined destination IP address 503. Part of the address may be masked using the source/destination IP address mask 508. The UDP/TCP source/destination port 504 505 specifies what client or server process the packet originates from on the source machine. The firewall engine can be configured to permit or deny a packet based upon these port numbers. The rule may include a range of values or a specific value for a TCP/UDP port. The counter 506 is used to track the number of times a rule has been matched, and at some threshold value will trigger a certain action, such as deny, log or alarm. The transport layer protocol 510 specifies which protocol above the IP layer, such as TCP or UDP, the policy rule is to be enforced against.

Figure 4:
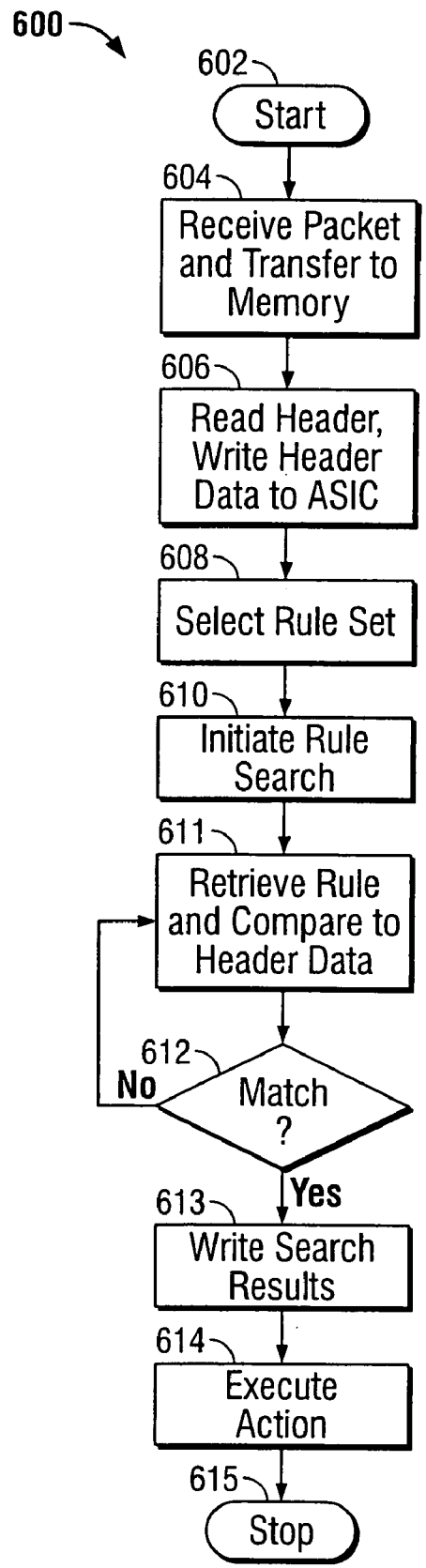
FIG. 4 is a flow diagram for a firewall screening process.

Referring to FIGS. 2*b* and 4, a process 600 executed by the firewall engine in the ASIC 204 is shown for screening packets using both the on-chip and off-chip rule memories. The firewall engine process begins at step 602. A packet is received at an interface (public network interface 122) and transferred to dual-ported memory 203 using a DMA process executed by memory controller 124 (604).

CPU 134 reads the packet header information from packet memory and writes the packet information into special registers on ASIC 204 (606). These registers are mapped onto the system memory space, so CPU 134 has direct access to them. In an exemplary hardware firewall, the registers include: a source IP register; a destination IP register; a port register; a protocol register; and an acknowledge register, for storing the acknowledge bit from the packet.

CPU 134 also specifies which rule set to search by writing to a rule set specifier register (608). CPU 134 issues a command to the firewall engine located in the ASIC 204 by writing to a control register to initiate the ASIC rule search (610). Alternatively, the firewall engine may first check a stored look-up table with criteria relating to ongoing current applications or services, before searching the rules. In that case, the firewall engine first compares the contents of the special registers to the contents of a look-up table, where the look-up table includes the IP address, port and protocol corresponding to each current application or service. For example, if the packet is an FTP packet for an FTP that is ongoing, this information will be in the look-up table. If, on the other hand, the packet is an FTP packet for a newly-initiated FTP, the information will not be in the look-up table.

If the information is not in the look-up table, or if a look-up table is not used, the firewall engine then compares the contents of the special registers to each rule in sequence (611) until a match is found (612). The search stops when a match is found (613). Alternatively, for certain rules, known as counter rules, the firewall engine will increment the count register and continue the search. If the count threshold is exceeded, or if the search locates a match for a non-counter rule, the search results are written to a status register 616. Likewise, if no match is found, and the entire set of rules has been examined, the search results are written to the status register. In addition, when a match is found, if a look-up table is used the information identifying the current application, such as the IP address, port and protocol, are written to the look-up table so that later packets in the current application may be processed using the look-up table instead of a rule search.

During the search, CPU 134 polls the status register to check whether the firewall engine is busy or has completed the search. When the CPU 134 determines that the search is complete, the CPU 134 executes certain actions against the current packet based on the information in the status register, such as permit or deny the packet, signal an alarm, and log the packet.

Figure 5:
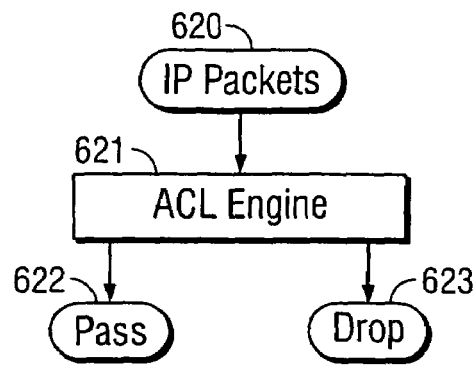
FIG. 5 is a data-flow chart for a prior art firewall.

The process described above is a prior art one-pass search process, as illustrated in FIG. 5: the ACL engine 621 conducts a search through an optional look-up table, and then through rules, as illustrated in FIG. 4, to determine whether a given packet matches a rule in the set and take action on that basis. The rules use a set of matching criteria—for example, source and destination IP address, and port number, indicating the application. These rules are fixed and use known matching criteria. The ACL engine 621 then allows some packets 622, and denies or drops, others 623.

Figure 6:
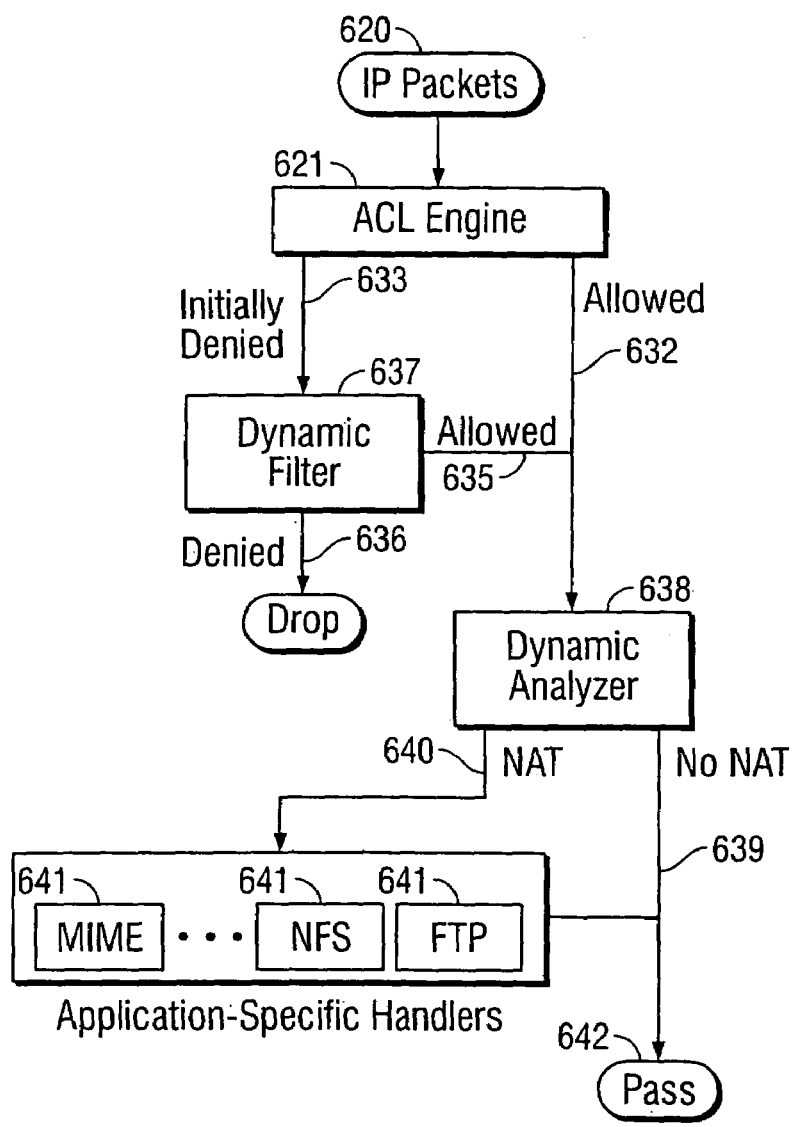
FIG. 6 is a data-flow chart for a firewall in accordance with one embodiment of the invention.

As shown in FIG. 6, in a preferred embodiment, the IP packets 620 enter the ACL engine 621. As in the prior art, the ACL engine 621 conducts a search, using fixed rules. The ACL engine then outputs allowed packets 632, and initially denied packets 633.

Unlike the prior art, the firewall engine that embodies one aspect of the present invention includes additional dynamic filtering, which further processes the packets. In particular, the initially denied packets 633 are processed by a dynamic filter 637, which allows some of the initially denied packets to pass through the firewall and enter the private network. The dynamic filter 637 conducts a search through an additional set of rules, which are dynamically generated. The dynamic filter 637 generates rules using criteria such as port number and IP address, which are extracted from incoming packets for applications, such as RealAudio, Netmeeting (which uses the H3232 protocol) and network file system (NFS).

For example, when an FTP is initiated, the first sequence of FTP packets, which includes information on the port number and the IP address, will be passed by the rules in the ACL engine 621. The dynamic filter 637 then extracts port number and IP address from this first sequence of packets, and generates new rules, similar to the fixed rules used by the ACL, including these criteria. Later sequences of FTP packets will be denied by the ACL engine 621, but the dynamic filter 637 will pass the packets based on the new, dynamically-generated rules. The way in which the search through the dynamically-generated rules is conducted is similar to the approach used in the ACL engine 621. The dynamic filter then drops packets which are finally denied 636, and allows other initially denied packets, which meet the additional access control requirements, to pass 635 through the firewall and enter the private network.

This approach to processing the incoming IP packets has advantages over the prior art. Using dynamically-generated rules allows for more flexible access policy. However, if dynamic rule generation was included in the ACL engine 621, the processing speed would be decreased. The dynamic filter 637 used in accordance with the present invention, following the ACL engine 621, advantageously allows the use of dynamically-generated rules, without increasing the processing time for those IP packets, which are initially allowed 632 by the ACL engine 621 based on the fixed rule set.

Another preferred embodiment, as shown in FIG. 6, additionally allows for network address translation (NAT), to enable IP addresses, port numbers and message authentication codes (MACs) in the private network to be concealed from the public network. The public network can only access this information for the firewall. Thus, the destination information in the headers in the incoming packets must be changed, to reflect the private network IP addresses, port numbers and MAC. Furthermore, source information in the headers of outgoing packets must also be changed, to reflect the firewall network IP address, port number and MAC.

Figure 7A:
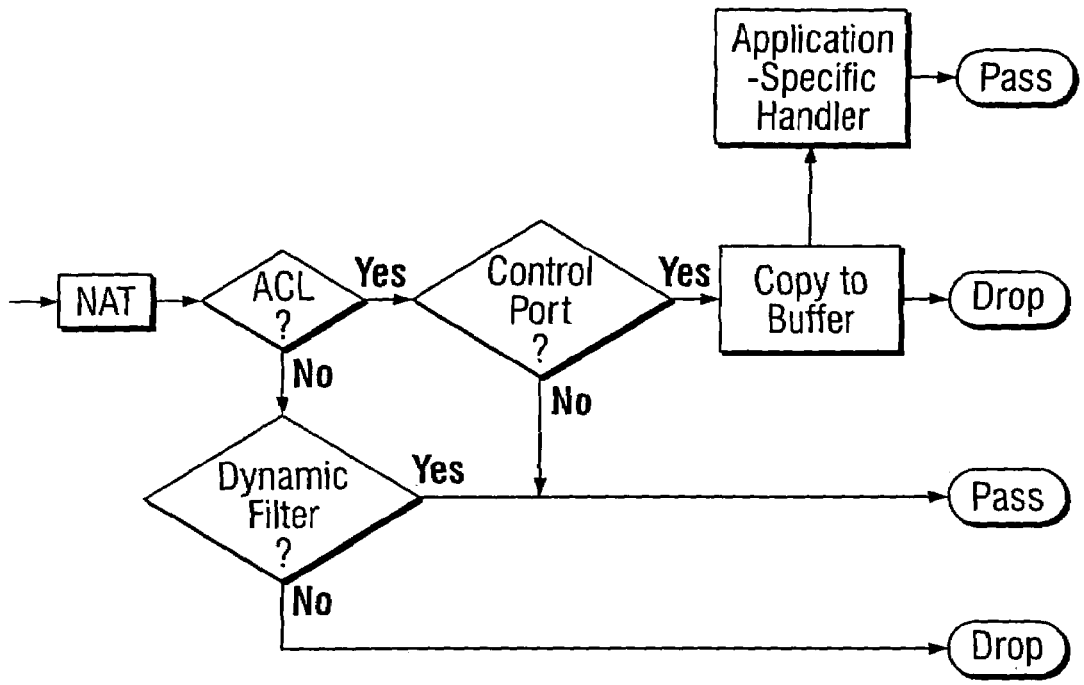
FIG. 7*a* is a logic diagram for processing incoming packets in accordance with the invention.
Figure 7B:
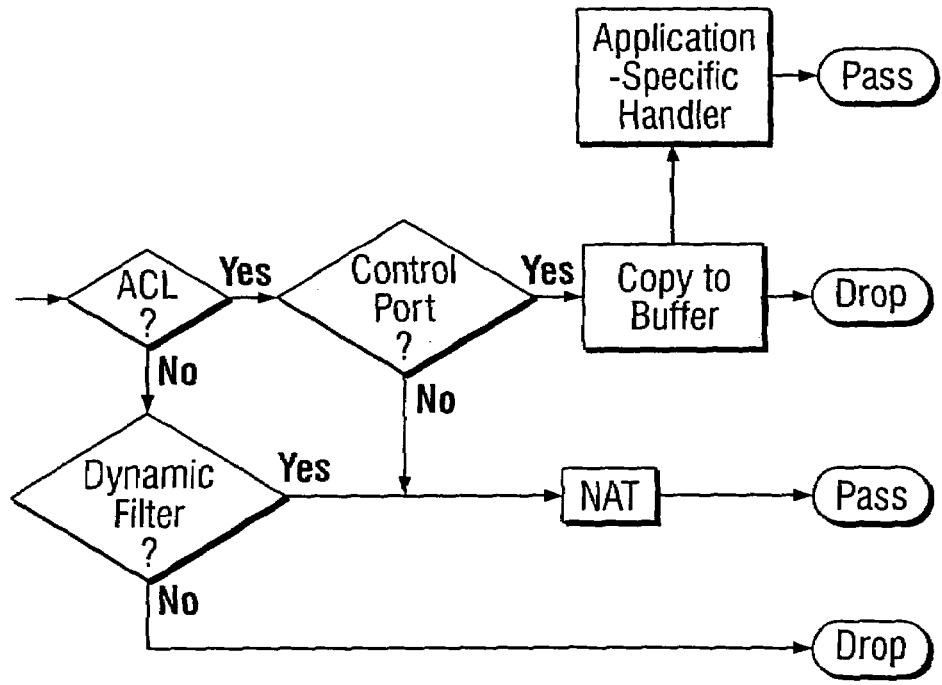
FIG. 7*b* is a logic diagram for processing outgoing packets in accordance with the invention.

However, depending on the particular application used, information relating to the IP address or port number may be embedded in the packet content or payload, as well as in the header. In that case, the packet payload for an incoming packet must be translated to reflect the internal IP address and port number, as shown in FIG. 7a. Likewise, the packet payload for an outgoing packet must be translated to reflect the firewall address and port number, as shown in FIG. 7b.

As shown in FIG. 6, the dynamic analyzer 638 examines those packets which are initially allowed 632 by the ACL engine 621. The dynamic analyzer 638 determines whether a given packet may require modification, due to embedded address or port number information. The dynamic analyzer 638 then separates packets which may require modification 640 from packets which do not require modification 639. Packets which include IP address or port number information are identified by reading a protocol-specific field in the header. The dynamic analyzer 638 allows those initially allowed packets 632 and 635 which do not require modification 639 to pass through the firewall 642 into the private network.

The packets 640 which may require modification are then passed to an application-specific handler 641. The application-specific handler 641, as its name suggests, processes packets 640 for a particular application, such as FTP or NFS. The application-specific handler examines the protocol, session, port number and IP address, as well as the payload. In one embodiment, the application-specific handler may modify certain packets, which have been allowed 632 and 635. If the IP address or port number in the packet header have been changed, for an incoming packet, or must be changed, for an outgoing packet, the application-specific handler translates the payload to reflect the change. In another embodiment, multiple application-specific handlers 641 may be provided, to process packets for different applications. For example, the firewall may include both an FTP-specific handler and an NFS-specific handler.

In another embodiment, the application-specific handler 641 may include the capability to send a "reset" packet to inform the TCP processor sending the denied packets that the connection has been denied. The connection is thereby rejected, rather than merely dropped. The rejection will prevent the TCP processor sending the denied packets 636 from continuing to try to connect with the network, thereby avoiding wasted bandwidth.

In conjunction with the software functionality description provided in the present disclosure, an apparatus in accordance with the preferred embodiments may be programmed using methods known in the art as described, for example, in Francise et. al., *Professional Active Server Pages* 2.0, Wrox Press (1998), and Zaration, *Microsoft C++6.0 Programmer's Guide*, Microsoft Press (1998), the contents of each of which is hereby incorporated by reference into the present application.

While preferred embodiments of the invention have been described, these descriptions are merely illustrative and are not intended to limit the present invention. For example, while the preferred embodiment discusses primarily a hardware implementation of a firewall, the scope of the preferred embodiments is not so limited. Those skilled in the art will recognize that the disclosed software and methods are readily adaptable for broader network analysis applications.

What is claimed is:

1. A method, comprising:
   establishing a set of rules for controlling access to and from a network device for incoming and outgoing data units;
   receiving, at the network device, a first sequence of data units; and
   adding one or more first rules to the set of rules based on data extracted from the received first sequence of data units.

2. The method of claim 1, further comprising:
   filtering other data units received at the network device based on the set of rules.

3. The method of claim 2, wherein filtering the other data units received at the network device comprises:
   determining whether the other data units match one of the rules of the set of rules;
   denying access to any of the other data units that do not match one of the rules of the set of rules; and
   permitting access to any of the other data units that match one of the rules of the set of rules.

4. The method of claim 1, wherein the network device is coupled to a private network and to a public network and the method further comprises:
   receiving data units from the private network, wherein headers associated with the data units include network addresses and port numbers associated with source nodes in the private network; and
   replacing, in the headers, the network addresses and port numbers associated with the source nodes with a network address and a port number associated with a firewall implemented at the network device.

5. The method of claim 4, further comprising:
   identifying data units of the received data units that have network addresses and port numbers associated with the source nodes embedded in payloads of the data units; and
   replacing the network addresses and port numbers embedded in the payloads of the identified data units with the network address and a port number associated with the firewall.

6. The method of claim 1, wherein the network device is coupled to a private network and to a public network and the method further comprises:
   receiving data units from the public network, wherein headers associated with the data units include a network address and port number associated with a firewall implemented at the network device; and
   replacing, in the headers for each of the data units, the network address and port number associated with the firewall with network addresses and port numbers associated with corresponding destination nodes in the private network.

7. The method of claim 6, further comprising:
   identifying data units of the received data units that have a network address and port number associated with the firewall embedded in payloads of the data units; and
   replacing the network address and port number embedded in the payloads of the identified data units with the network addresses and port numbers associated with corresponding destination nodes for each of the data units in the private network.

8. The method of claim 1, further comprising:
   receiving a second sequence of data units; and
   modifying the set of rules based on data extracted from the received second sequence of data units.

9. The method of claim 1, further comprising:
   receiving a second sequence of data units; and
   adding one or more second rules to the set of rules based on data extracted from the received second sequence of data units.

10. The method of claim 1, wherein the first sequence of data units comprises file transfer protocol (FTP) data units.

11. The method of claim 1, wherein the data extracted from the received first sequence of data units comprises a port number and a network address associated with a destination of the data units.

12. The method of claim 1, wherein the data extracted from the received first sequence of data units comprises a port number and a network address associated with a source of the data units.

13. A network device, comprising:
    an access control engine configured to establish a set of rules for controlling access to and from the network device for incoming and outgoing data units; and
    a dynamic filter configured to add one or more first rules to the set of rules based on data extracted from a first sequence of data units received at the network device.

14. A method for implementing a firewall at a network device, comprising:
- receiving a first sequence of data units at the network device;
- comparing the first sequence of data units to a first rule set to produce first comparison results;
- comparing, based on the first comparison results, the received first sequence of data units with a second rule set to produce second comparison results;
- filtering the first sequence of data units based on the second comparison results;
- receiving a second sequence of data units;
- extracting data from the received second sequence of data units; and
- modifying the second rule set based on the extracted data.

15. The method of claim 14, wherein filtering the first sequence of data units comprises:
- denying access to any of the data units that do not match one of the rules of the second rule set; and
- permitting access to any of the data units that match one of the rules of the second rule set.

16. The method of claim 14, wherein the second sequence of data units comprises file transfer protocol (FTP) data units.

17. The method of claim 14, wherein the data extracted from the received second sequence of data units comprises a port number and a network address associated with a destination of the data units.

18. The method of claim 14, wherein the data extracted from the received second sequence of data units comprises a port number and a network address associated with a source of the data units.

19. The method of claim 14, further comprising:
- receiving a third sequence of data units at the network device;
- comparing the third sequence of data units to the first rule set to produce third comparison results;
- comparing, based on the third comparison results, the received third sequence of data units with the modified second rule set to produce fourth comparison results; and
- filtering the third sequence of data units based on the fourth comparison results.

20. The method of claim 19, wherein filtering the third sequence of data units comprises:
- denying access to any of the third sequence of data units that do not match one of the rules of the modified second rule set; and
- permitting access to any of the third sequence of data units that match one of the rules of the modified second rule set.

21. A network device, comprising:
- an access control engine configured to compare a first sequence of data units received at the network device to a first rule set to produce first comparison results; and
- a dynamic filter configured to:
  - compare, based on the first comparison results, the received data units with a second rule set to produce second comparison results,
  - filter the first sequence of data units based on the second comparison results, and
  - modify the second rule set based on data extracted from a second sequence of data units.

22. A method, comprising:
- establishing a set of rules for controlling access to and from a network device for incoming and outgoing data units;
- dynamically modifying the set of rules based on data extracted from first data units received at the network device; and
- filtering second data units received at the network device based on the modified set of rules.

23. The method of claim 22, wherein filtering the second data units received at the network device comprises:
- determining whether the received second data units match one of the rules of the modified set of rules;
- denying access to any of the received second data units that do not match one of the rules of the modified set of rules; and
- permitting access to any of the received second data units that match one of the rules of the modified set of rules.

24. The method of claim 22, wherein the second sequence of data units comprises file transfer protocol (FTP) data units.

25. The method of claim 22, wherein the data extracted from the first data units comprises a port number and a network address associated with a destination of the first data units.

26. The method of claim 22, wherein the data extracted from the first data units comprises a port number and a network address associated with a source of the first data units.

27. A network device, comprising:
- an access control engine configured to establish a set of rules for controlling access to and from the network device for incoming and outgoing data units; and
- a dynamic filter configured to:
  - modify the set of rules based on data extracted from first data units received at the network device to produce a first modified set of rules,
  - filter second data units received at the network device based on the first modified set of rules,
  - modify the first modified set of rules based on data extracted from second data units received at the network device to produce a second modified set of rules, and
  - filter third data units received at the network device based on the second modified set of rules.

28. A system, comprising:
- means for establishing a set of rules for controlling access to and from a network device for incoming and outgoing data units;
- means for dynamically modifying the set of rules based on data extracted from first data units received at the network device; and
- means for filtering second data units received at the network device based on the dynamically modified set of rules.

* * * * *